United States Patent Office 3,491,549
Patented Jan. 27, 1970

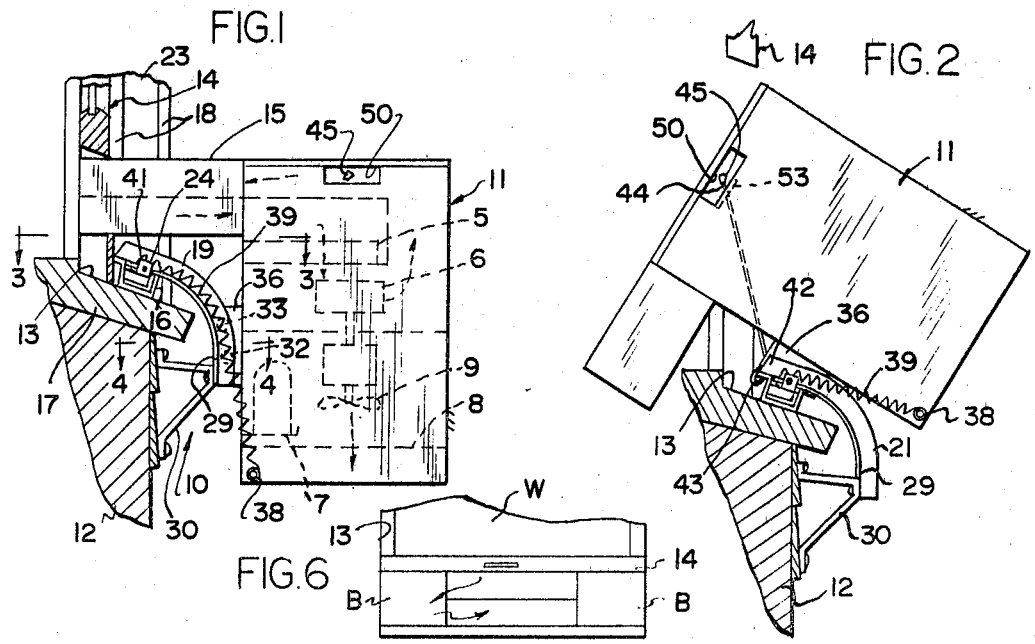
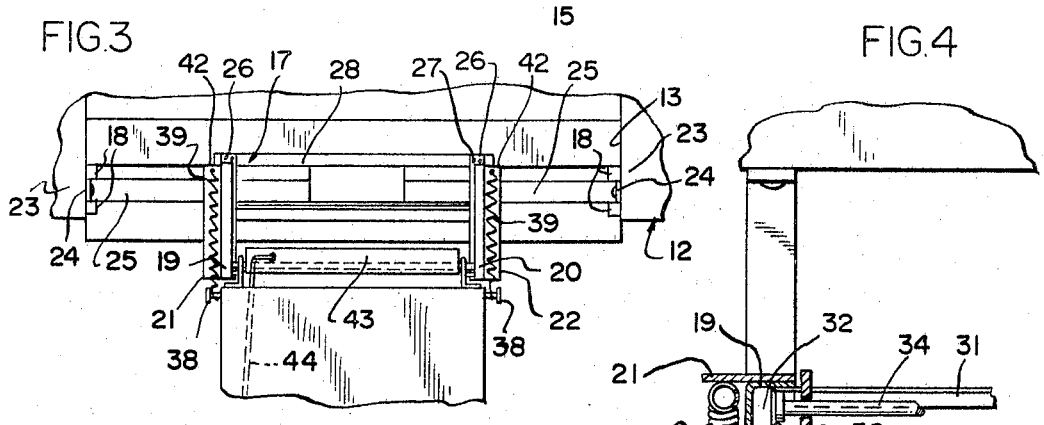
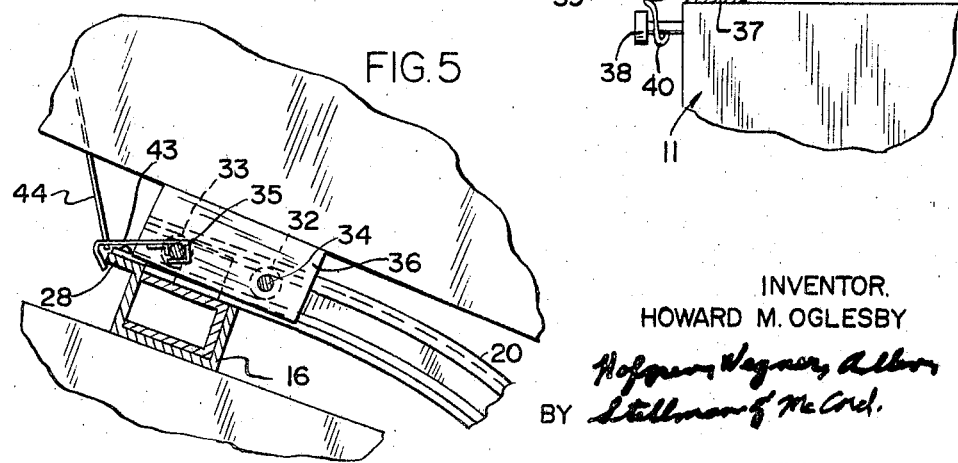

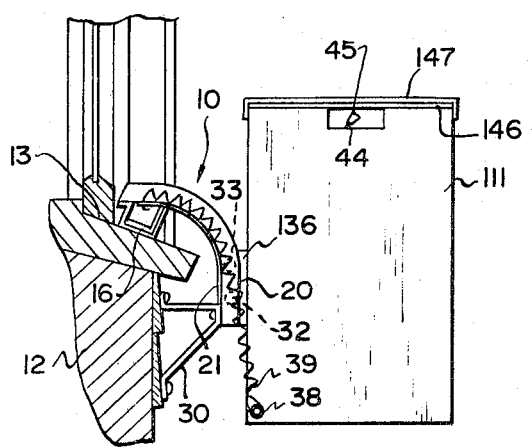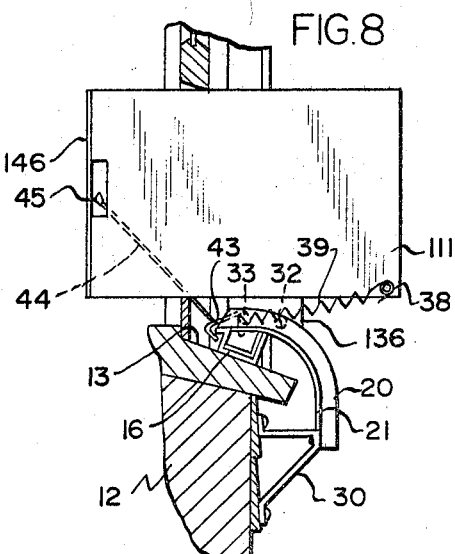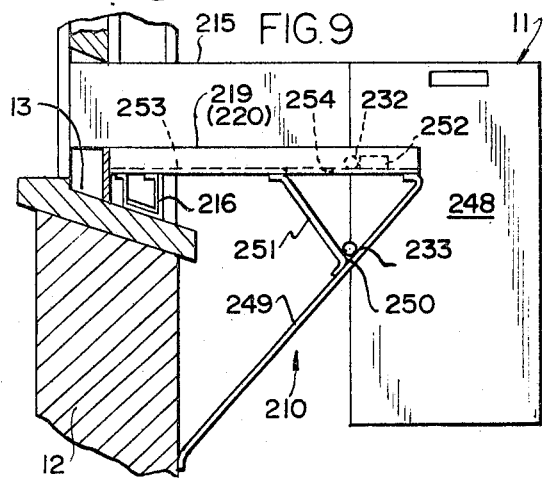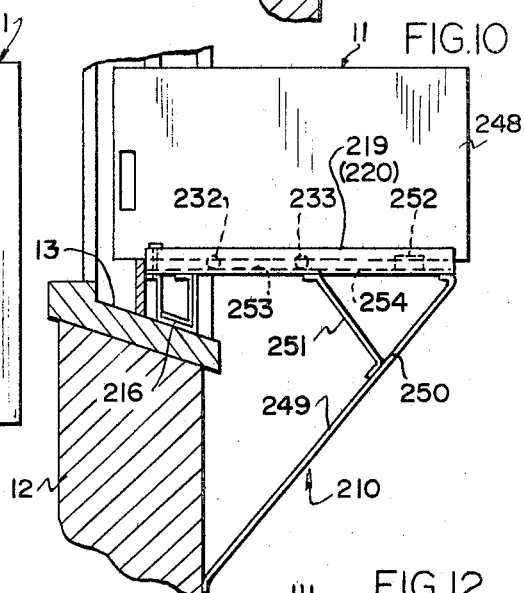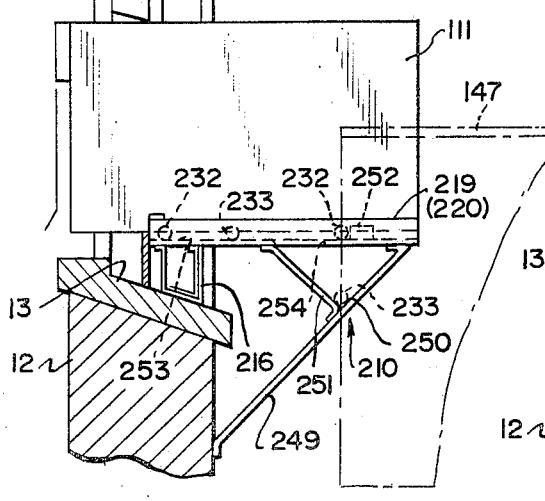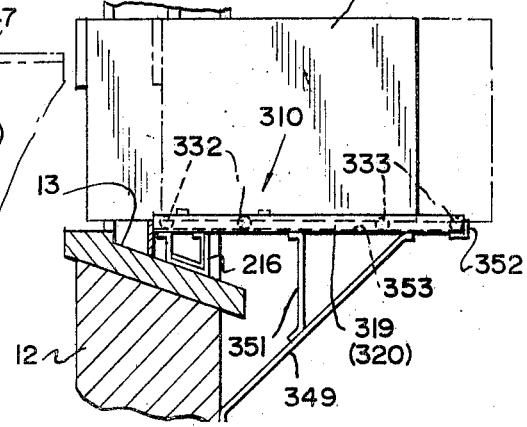

3,491,549
OUTSIDE MOUNTING APPARATUS FOR
AIR CONDITIONER
Howard M. Oglesby, Evansville, Ind., assignor to Whirlpool Corporation, a corporation of Delaware
Filed Apr. 19, 1968, Ser. No. 722,717
Int. Cl. F24f 5/00; E06b 7/03
U.S. Cl. 62—262                                          21 Claims

ABSTRACT OF THE DISCLOSURE

A mechanism for mounting a window air conditioner for selective disposition fully outwardly of a window opening and at the window opening. The air conditioner may comprise an outboard air conditioner with duct means for conducting the refrigerated air therefrom through the window opening or may comprise a conventional air conditioner adapted to extend through the window opening in the operative disposition for delivering refrigerated air to inwardly thereof. The mechanism includes track means and means on the air conditioner cooperating with the track means for guiding the air conditioner to the different dispositions. The mechanism is arranged to dispose the air conditioner in a servicing position accessible from inwardly of the window opening for facilitated maintenance. The mechanism further includes means for counterbalancing the air conditioner for facilitated movement between the respective dispositions.

---

This invention relates to window air conditioner mounting means and in particular to such mounting means for mounting an air conditioner outwardly of the window opening.

In the conventional window air conditioner installation, the air conditioner is installed by suitable mounting means on the wall in which the window opening is provided to extend through the window opening and with an outer portion thereof exposed to outwardly of the window openings for exothermic heat transfer to the outside air. Such conventional mounting is undesirable in that the air conditioner effectively blocks a portion of the window opening at all times including during cold weather when the air conditioner is not in use. Thus, it its desirable to provide means for mounting the air conditioner to permit it to be moved to a disposition fully outwardly of the window and, preferably, with at least a major portion thereof disaligned, or disposed in a non-blocking disposition relative to the window. Further, it is desirable to mount the air conditioner effectively fully outwardly of the window opening and provide means for conducting the refrigerated air inwardly through the window opening so that only a small portion of the window opening need be utilized in effecting the delivery of refrigerated air therethrough.

While it is desirable to so mount the air conditioner for exterior disposition either for storage or operation thereof, it is further desirable to provide for facilitated accessibility to the air conditioner from inwardly of the window opening such as for facilitated maintenance, or servicing, of the air conditioner. Still further it is desirable to provide such mounting means which may be installed from inwardly of the window opening such as where the air conditioner is installed in a high rise building.

A further desideratum is to permit the air conditioner to be readily retracted when desired so as to permit the use of the window in the normal manner as by fully closing the same without impediment by the air conditioner or means for mounting the air conditioner.

The present invention comprehends an improved window air conditioner mounting mechanism providing each of the desirable features discussed above in a novel and simple manner.

Thus, a principal feature of the present invention is the provision of a new and improved window air conditioner mounting mechanism.

Another feature of the invention is the provision of such a mounting mechanism arranged to permit the air conditioner to be disposed fully outwardly of the window opening when desired.

A further feature of the invention is the provision of such a mounting mechanism arranged to be installed from inwardly of the window opening.

Still another feature of the invention is the provision of such a mounting mechanism arranged to provide for selective disposition of the air conditioner fully outwardly of the window opening and in a position accessible from inwardly of the window opening.

A still further feature of the invention is the provision of such a mounting mechanism for selectively mounting the air conditioner fully outwardly of the window opening in the operating arrangement and including means for conducting refrigerated air from the air conditioner inwardly through the window opening.

Another feature of the invention is the provision of such a mounting mechanism including means for counterbalancing the air conditioner for facilitated movement thereof between the different desired positions.

A still further feature of the invention is the provision of such a mounting mechanism including means for arranging the air conditioner at an angle to the horizontal in the accessible disposition.

Another feature of the invention is the provision of such a mounting mechanism including new and improved means for releasably locking the air conditioner in the accessible position.

A further feature of the invention is the provision of such a mounting mechanism wherein the air conditioner is disposed vertically in the exterior disposition.

Still another feature of the invention is the provision of such a mounting mechanism wherein a major portion of the air conditioner is disposed below the bottom of the window opening in the exterior disposition.

A yet further feature of the invention is the provision of such a mounting mechanism including guide means, means for mounting the guide means on the wall adjacent the window opening, carrier means, and means for mounting the carrier means on a window air conditioner, the carrier means movably engaging the guide means to guide the air conditioner to the different dispositions and cause a substantial portion of the air conditioner to be disaligned relative to the window opening in the first disposition.

In summary, the invention comprehends a new and improved mechanism for mounting a window air conditioner for selective disposition relative to the window opening with at least one of the dispositions being fully outwardly of the window opening and with a substantial portion of the air conditioner disaligned relative to the window opening so as to effectively minimize the blocking of the window opening by the air conditioner.

Other features and advantages of the invention will be apparent from the following description taken in connection with the accompanying drawing wherein:

FIGURE 1 is a side elevation of a window air conditioner mounting mechanism embodying the invention installed on a portion of a building wall having a window opening therein;

FIGURE 2 is a side elevation similar to that of FIGURE 1, but with the air conditioner in an inner, accessible disposition;

FIGURE 3 is a fragmentary horizontal section taken substantially along the line 3—3 of FIGURE 1;

FIGURE 4 is a fragmentary enlarged horizontal section taken substantially along the line 4—4 of FIGURE 1;

FIGURE 5 is a fragmentary enlarged vertical section showing the locking means cooperating with the sill support for locking the air conditioner in the accessible position of FIGURE 2;

FIGURE 6 is a fragmentary front elevation thereof installed in the window opening;

FIGURE 7 is a side elevation of the mounting mechanism as used with another form of air conditioner;

FIGURE 8 is a side elevation similar to FIGURE 7, but with the air conditioner in an operating position wherein the air conditioner extends through the window opening;

FIGURE 9 is a side elevation of a modified form of mounting mechanism for use with an air conditioner of the type shown in FIGURES 1 through 6;

FIGURE 10 is a side elevation thereof with the duct means removed and with the air conditioner in a servicing position extending into the window opening;

FIGURE 11 is a side elevation of the mounting mechanism of FIGURES 9 and 10 as used with the form of air conditioner of FIGURES 7 and 8, with the air conditioner shown in an operating position in full lines and in a storage position in dotted lines; and FIGURE 12 is a side elevation similar to FIGURE 11, but illustrating a further modified form of mounting mechanism for use with the air conditioner of the type shown in FIGURES 7 and 8, with the air conditioner shown in an operating position in full lines and in a storage position in dotted lines.

In the exemplary embodiment of the invention as disclosed in FIGURES 1 through 6 of the drawing, a mounting mechanism generally designated 10 is provided for movably mounting an outboard type air conditioner generally designated 11 on a wall 12 having a window opening 13 selectively closed by a window sash 14. As shown in FIGURE 1, the air conditioner 11 includes conventional air conditioning means such as evaporator 5, blower 6, compressor 7, condenser 8, and fan 9. Mechanism 10 is arranged to mount the air conditioner 11 so that in a first disposition, such as shown in FIGURE 1 of the drawing, the air conditioner is disposed fully outwardly of the window opening 13 with the major portion thereof in disalignment therewith to effectively minimize blocking of the window by the air conditioner during use. More specifically, as shown in FIGURES 1 and 6, almost all of the air conditioner is disposed below the bottom of the window opening 13 outwardly of wall 12 so that only a small upper portion of the air conditioner is visible through the window opening 13.

The air conditioner 11 may comprise an air conditioner adapted to be operated in a vertical position, as shown in FIGURE 1, with the refrigerated air being delivered thereto and therefrom through a suitable transversely divided duct 15 extending through the window opening 13 from the upper end of the air conditioner. As shown in FIGURE 6, the duct may have a transverse extent less than that of the window opening and suitable filler board B may be fitted at the opposite side of the duct in the opening 13 to effectively seal the duct to wall 12.

The mechanism 10 herein includes a sill support 16 secured to the sill 17 at the bottom of the window opening 13. The length of the sill support 16 is adjustable to accommodate it to windows of different widths and is adapted to be received between the window guides 18 at the opposite sides of the opening 13. The mechanism 10 further includes a pair of arcuate tracks 19 and 20 and a corresponding pair of arcuate spring guides 21 and 22. The sill support 16 is secured to the window frame 23 by means of upturned tabs 24 at the opposite ends of a pair of extension members 25 defining the adjustable ends of the sill support. One end 26 of each of the tracks 19 and 20 is secured to the sill support 16 by suitable means such as bolts 27 extending through a flange 28 defining the inner edge of the sill support. The other end 29 of each track 19 and 20 is secured to wall 12 by suitable brackets 30 (see FIGURE 2). One or more horizontal braces, such as brace 31 (FIGURE 4), may be provided between the tracks 19 and 20 to rigidify the mounting thereof on the wall.

The air conditioner 11 is mounted on the tracks 19 and 20 by means of a pair of rollers 32 and 33 carried on the opposite ends of a pair of axles 34 and 35, respectively, journalled in a pair of flange mounting brackets 36 secured to the air conditioner at the opposite sides thereof. As shown in FIGURE 4, the rollers are received within the tracks which may include an inturned distal portion 37 to effectively retain the rollers therein. Posts 38 may be further provided on the air conditioner at one end thereof and coil springs 39 are provided with a turned end 40 connected to post 38. The opposite ends 41 of the springs connected to the upper ends 42 of the spring guides 21 and 22. As shown in FIGURE 1, when the air conditioner 11 is disposed in the outer position, the spring 39 is extended tending to counterbalance the air conditioner and permit facilitated upward movement thereof to the accessible position of FIGURE 2 when desired. The springs rest against the arcuate spring guides 21 and 22. The downward movement of the air conditioner 11 is limited by the engagement of the rollers 32 with the horizontal brace 31, and rotation of the air conditioner 11 about the rollers 32 is effectively precluded by the retention of the rollers 33 in the tracks 19 and 20.

Thus, in normal use as shown in FIGURE 6, air conditioner 11 is effectively disposed out of view from inwardly of the window W, except for the shallow duct 15 for conducting air to and from the air conditioner through window opening 13. Should it be desired to service the air conditioner 11, the user may readily move the air conditioner from the exterior position of FIGURE 1 to the accessible position of FIGURE 2 wherein the air conditioner extends at an upward angle through the window opening 13. This is readily accomplished by firstly raising the sash 14, grasping the upper end of the air conditioner at handholds 50, and drawing it upwardly along the arcuate tracks 19 and 20, with the biasing action of the spring 39 assisting the raising of the air conditioner. The air conditioner may be retained in the upper servicing position by means of a lock hook 43 which is rotatably mounted on the axle 35 (see FIGURE 5). The hook 43 engages the inwardly projecting flange 28 of the sill support 16 to prevent the downward movement of the air conditioner. The hook 43 may be disengaged from the flange 28 by means of a control wire 44 provided with a manual control handle 45 accessible from the upper end of the air conditioner from inwardly of the window opening 13 in the accessible position of FIGURE 2.

A spring lock 53 may be provided on air conditioner 11 for cooperation with the control wire 44 to bias the lock hook 43 to a raised, released position. Thus, when the user swings the air conditioner 11 to the position of FIGURE 2, engagement of the hook 43 with the flange 28 is effected by a depression of the handle 45 while concurrently permitting the air conditioner to move outwardly to the locked position of FIGURE 5. When it is desired to restore the air conditioner to the position of FIGURE 1, the user merely moves the air conditioner slightly inwardly whereupon spring lock 53 will release the hook 43 to clear the flange 28, and then permits the air conditioner to move along the tracks 19 and 20 to the position of FIGURE 1. During this movement, the coil springs 39 are extended about the spring guides 21 and 22 whereby the counterbalancing force on the air conditioner is generally maintained in the direction of movement of the air conditioner.

Turning now to the embodiment of the invention as disclosed in FIGURES 7 and 8, the mounting mechanism 10 is shown as utilized with a modified air conditioner generally designated 111 comprising a conventional air conditioner having a front 146 through which the air is circulated to and from the unit. As shown in FIGURE 7, the exterior disposition of the air conditioner 111 is the storage position. A suitable cover 147 may be provided on the end 146 to sealingly close the same in the storage position. The air conditioner 111 is provided with brackets 136, which are similar to brackets 36 of air conditioner 11, but arranged to dispose the air conditioner substantially horizontally when brought to the upper end of the tracks 19 and 20 to extend through the window opening 13 in the operating position of the air conditioner. Thus, as shown in FIGURE 8, the air conditioner may be locked in the operating position by the lock hook 43, which may be readily released when it is desired to dispose the air conditioner in the storage position of FIGURE 7. As with air conditioner 11, the springs 39 counterbalance the air conditioner for facilitated movement thereof between the storage and operating positions of FIGURES 7 and 8.

Thus, air conditioner 111 may comprise a conventional air conditioner with brackets 136 suitably secured thereto as by screws, with mounting means 10 providing for self-storage of the air conditioner exteriorly of the wall 12 when the air conditioner is not in use. The mounting apparatus of FIGURES 7 and 8 is similar to and functions similarly to the mounting apparatus of FIGURES 1 through 6, except for the difference in the form of the air conditioner.

Turning now to the embodiment of the invention illustrated in FIGURES 9 and 10, a modified mounting mechanism generally designated 210 is provided for mounting the air conditioner 11 on the wall 12. As illustrated, the duct 215 is removably installed on the cabinet 248 of the air conditioner 11. The mounting mechanism 210 includes a pair of substantially straight horizontal tracks 219 which are supported on the wall 12 by brackets 249 and a sill support 216. Each track includes a bottom flange 253 having a break 254 on its inner edge. The cabinet 248 is provided with a pair of rollers 232 and 233 on each of the opposite sides thereof. The rollers 233 ride along the inner edge of the tracks and move downwardly through the break 254, while the rollers 232 ride along the continuous outer portion of the flange. In the operating position of FIGURE 9, roller 232 is supported on the track 219, while roller 233 is disposed in a corner 250 defined by the bracket 249 and a guide bracket 251 extending angularly downwardly from the track 219 to a mid-portion of the bracket 249. A stop 252 is provided on the tracks 219 for limiting the outward movement of the roller 232, thus positioning the air conditioner 11 in the vertical arrangement of FIGURE 9 with the duct 215 extending through the window opening 13 for operation of the air conditioner in a manner similar to that of air conditioner 11 as shown in FIGURE 1.

When it is desired to service the air conditioner, the duct 215 is removed and the cabinet 248 swung upwardly through the window opening to project through the window opening 13. The rollers 232 and 233 rest on the flange 253 as shown in FIGURE 10. The user may then service the air conditioner while supported in this position having access to the end thereof projecting through the window opening. Thus, mechanism 210 is generally similar to mechanism 10 and functions in a similar manner except for the modified method of controlling the movement of the air conditioner between its operative and service positions.

Turning now to FIGURE 11, the mounting mechanism 210 is illustrated in conjunction with the air conditioner 111 with the movement of the air conditioner 111 between the storage (dotted line) position and the operative (full line) position being effected by movement of the rollers 233 and 232 on the tracks 219 and 220. As shown in the embodiment of FIGURES 7 and 8, the air conditioner 111 extends through the window opening 13 in the operative position with the rollers at the inner end of the tracks 219 and 220, while the air conditioner is effectively disposed out of sight in the storage position. In the storage position, the air conditioner may be protected with a cover 147 which is removed when the air conditioner is brought to the operative position.

Referring now to FIGURE 12, a modified form of mounting mechanism generally designated 310 is shown to comprise a mounting mechanism similar to mounting mechanism 210 but having tracks 319 and 320 provided with flanges 353 which are continuous along their inner edge as well as along the outer portion. Thus, the air conditioner 111 is movable between an operative position in the window opening 13 shown in full lines in FIGURE 12 and a storage position outwardly of the window opening 13 as shown in dotted lines in FIGURE 12. In the storage position, both pairs of rollers remain on the track flanges with the outboard roller 333 abutting the stop 352. Thus, the arrangement of FIGURE 12 differs from the arrangements of FIGURES 1 through 11 in that the air conditioner is stored at the same level as that of its operating position. While visually obstructing a portion of the window opening, the arrangement of FIGURE 12 provides for a simple in and out movement of the air conditioner and, thus, offers an advantage where such visual obstruction is not objectionable. In each of the disclosed embodiments, the window sash may be fully closed when the air conditioner is disposed in the storage position, thereby eliminating air infiltration through the air conditioner as occurs where the air conditioner is stored in the window opening.

The embodiments of FIGURES 7 through 12 are similar to the embodiment of FIGURES 1 through 6 and function in similar manners except as otherwise noted. The elements of the embodiments of FIGURES 7 and 8 which are similar to the embodiment of FIGURES 1 through 6 are identified by similar reference numerals, except one hundred higher. The elements of FIGURES 9 through 11 which are similar to the embodiment of FIGURES 1 through 6 are identified by similar reference numerals except two hundred higher. The elements of FIGURE 12 which are similar to the embodiment of FIGURES 1 through 6 are identified by similar reference numerals except three hundred higher.

While I have shown and described certain embodiments of my invention, it is to be understood that it is capable of many modifications. Changes, therefore, in the construction and arrangement may be made without departing from the spirit and scope of the invention as defined in the appended claims.

The embodiments of the invention in which in exclusive property or privilege is claimed are defined as follows:

1. Mechanism for mounting a window air conditioner on a wall for movement relative to a window opening in the wall to any one of a plurality of different dispositions, said mechanism comprising: guide means; means for mounting said guide means on the wall adjacent said window opening; carrier means; and means for mounting said carrier means on the window air conditioner, said carrier means movably engaging said guide means, said guide means cooperating with said carrier means to define means for guiding the air conditioner selectively to a first disposition wherein a substantial portion of the air conditioner is disaligned relative to the window opening whereby the window opening is substantially unobstructed, and a second disposition wherein at least a portion of the air conditioner is disposed in the window opening whereby the window opening is substantially obstructed.

2. The window air conditioner mounting mechanism of claim 1 further including means for biasing the air conditioner to said second disposition.

3. The window air conditioner mounting mechansm of claim 1 further including means for releasably locking the air conditioner in said second disposition.

4. The window air conditioner mounting mechanism of claim 1 including means for disposing said air conditioner substantially vertically in said first disposition.

5. The window air conditioner mounting mechanism of claim 1 including means for disposing the major portion of said air conditioner below the bottom of said window opening in said first disposition.

6. The window air conditioner mounting mechanism of claim 5 further including duct means for conducting refrigerated air from the air conditioner inwardly through said window opening when the air conditioner is in said first disposition.

7. The window air conditioner mounting mechanism of claim 5 further including removable duct means for conducting refrigerated air from the air conditioner inwardly through said window opening when the air conditioner is in said first disposition, said duct means being removed from said air conditioner to permit movement of the air conditioner to said second disposition.

8. The window air conditioner mounting mechanism of claim 1 including disposing means for disposing a portion of the air conditioner within said window opening in said second disposition.

9. The window air conditioner mounting mechanism of claim 1 including means for disposing the air conditioner at an angle to the horizontal in said second disposition.

10. The window air conditioner mounting mechanism of claim 1 wherein said guide means comprises arcuate track means.

11. The window air conditioner mounting mechanism of claim 10 including a sill support and means for securing said track means to said sill support.

12. The window air conditioner mounting mechanism of claim 10 including an adjustable sill support and means for securing said track means to said sill support and said wall.

13. The window air conditioner mounting mechanism of claim 10 wherein said carrier means includes roller means rollingly engaging said track means.

14. The window air conditioner mounting mechanism of claim 1 wherein said mounting means includes a counterbalance spring having one end connected to the wall and the opposite end connected to the air conditioner to bias the air conditioner toward said second disposition.

15. The window air conditioner mounting mechanism of claim 1 further including a sill support on said wall and locking means on the air conditioner adapted to engage said sill support for retaining the air conditioner in said second disposition.

16. The window air conditioner mounting mechanism of claim 1 wherein the entirety of said mechanism is mounted on the wall outwardly of the window opening.

17. The window air conditioner mounting mechanism of claim 1 further including means for locking the air conditioner in said second disposition and means carried by the air conditioner to be accessible from inwardly of said window opening for actuating said locking means.

18. The window air conditioner mounting mechanism of claim 1 wherein the guide means comprises angularly related rectilinear track means.

19. The window air conditioner mounting mechanism of claim 18 including stop means for limiting outward movement of the carrier means.

20. The window air conditioner mounting mechanism of claim 1 wherein the air conditioner is provided with a parallelepiped housing having a cold air discharge duct opening through one end thereof, with said end being disposed uppermost in said first disposition, and said air conditioner further being provided with a removable cover for closing said end in said first disposition.

21. Mechanism for mounting a window air conditioner on a wall for movement relative to a window opening in the wall to any one of a plurality of different dispositions including a first storage disposition fully outwardly of the window opening and a second operating disposition wherein said air conditioner opens through the window opening, said mechanism comprising: means defining a guide extending generally horizontally outwardly from the wall adjacent the window opening; means for mounting said guide means on the wall; carrier means; and means for mounting said carrier means on the window air conditioner, said carrier means movably engaging said guide means to guide the air conditioner generally horizontally to said different dispositions, said guide means comprising generally rectilinear track means, said mounting means mounting said track means on the wall adjacent the bottom of said window opening.

References Cited

UNITED STATES PATENTS

| | | | |
|---|---|---|---|
| 2,316,640 | 4/1943 | Williams | 62—262 |
| 2,436,713 | 2/1948 | Cody | 62—262 |
| 2,717,508 | 9/1955 | Loveley | 62—262 |

WILLIAM J. WYE, Primary Examiner

U.S. Cl. X.R.

98—94; 248—134